(12) United States Patent
Goto et al.

(10) Patent No.: US 8,513,553 B2
(45) Date of Patent: Aug. 20, 2013

(54) COMBINATION LIGHT AND SWITCH ASSEMBLY

(75) Inventors: Kazuhiro Goto, Markham (CA); Salvatore Alesio, Newmarket (CA)

(73) Assignee: Tyco Electronics Canada ULC, Markham (CA)

( * ) Notice: Subject to any disclaimer, the term of this patent is extended or adjusted under 35 U.S.C. 154(b) by 198 days.

(21) Appl. No.: 12/889,850

(22) Filed: Sep. 24, 2010

(65) Prior Publication Data
US 2011/0013408 A1 Jan. 20, 2011

Related U.S. Application Data (63) Continuation-in-part of application No. 12/057,141, filed on Mar. 27, 2008, now abandoned.

(51) Int. Cl.
*H01H 9/18* (2006.01)
*H01H 13/06* (2006.01)

(52) U.S. Cl.
USPC ......... 200/317; 200/296; 200/302.2; 200/341

(58) Field of Classification Search
USPC .................... 200/61.58 R, 61.62, 296, 302.1, 200/302.2, 308, 310, 313, 314, 317, 329, 200/330, 341, 520
See application file for complete search history.

(56) References Cited

U.S. PATENT DOCUMENTS

| 2,241,647 A | 5/1941 | Simon |
| 2,575,211 A | 11/1951 | Flacke |
| 2,890,326 A | 6/1959 | Nallinger |
| 4,243,846 A | 1/1981 | Lenaerts et al. |
| 5,144,538 A | 9/1992 | Harris |
| 6,070,998 A | 6/2000 | Jennings et al. |
| 6,174,016 B1 | 1/2001 | Ponziani |
| 6,416,106 B2 | 7/2002 | Ponziani |
| 6,462,291 B1 * | 10/2002 | Sachs ......................... 200/302.2 |
| 6,601,978 B2 | 8/2003 | Andrea et al. |
| 6,621,446 B1 * | 9/2003 | Chaillie ........................ 341/176 |
| 6,689,973 B2 * | 2/2004 | Meagher et al. ........... 200/61.73 |
| 7,055,997 B2 * | 6/2006 | Baek ............................. 362/501 |
| 7,168,829 B2 | 1/2007 | Nagase |
| 7,244,897 B2 * | 7/2007 | Villagrasa et al. ......... 200/61.85 |
| 7,273,991 B2 * | 9/2007 | Korultay et al. ........... 200/61.62 |

(Continued)

FOREIGN PATENT DOCUMENTS

| DE | 20317635 U1 | 3/2004 |
| DE | 10 2005 017448 A1 | 10/2006 |
| EP | 1533451 A1 | 5/2005 |
| WO | 2009/064885 A1 | 5/2009 |

OTHER PUBLICATIONS

European Search Report, Mail Date May 25, 2013, EP 11 18 2225, Application No. 11182225.0-1756/2433836.

*Primary Examiner* — Michael Friedhofer (57) ABSTRACT

A combination light and switch assembly for a panel of a vehicle is provided. The assembly includes a circuit board having an LED contact and a latch contact. The latch contact is configured to electrically couple to a latch of the panel. A LED is joined to the LED contact. The LED is configured to illuminate at least a portion of the panel. An actuator assembly is moveable toward the circuit board so that the actuator assembly engages the latch contact to operate the latch of the panel when the latch contact is engaged by the actuator assembly.

20 Claims, 10 Drawing Sheets

(56) References Cited

U.S. PATENT DOCUMENTS

| | | | |
|---|---|---|---|
| 7,777,141 B2* | 8/2010 | Ishiguro | 200/61.52 |
| 8,044,313 B2* | 10/2011 | Yamamoto | 200/314 |
| 2004/0124659 A1 | 7/2004 | Vaitus et al. | |
| 2004/0173446 A1* | 9/2004 | Plana-Bague et al. | 200/314 |
| 2008/0149469 A1 | 6/2008 | Gaudet et al. | |
| 2008/0237009 A1 | 10/2008 | Weisz-Margulescu et al. | |
| 2009/0294265 A1* | 12/2009 | Kleinlein et al. | 200/302.2 |
| 2010/0072050 A1* | 3/2010 | Kubota | 200/341 |

* cited by examiner

COMBINATION LIGHT AND SWITCH ASSEMBLY

CROSS-REFERENCE TO RELATED APPLICATIONS

This application is a continuation in part of U.S. patent application Ser. No. 12/057,141 filed Mar. 27, 2008 now abandoned, which is herein incorporated by reference in its entirety.

BACKGROUND OF THE INVENTION

The subject matter described herein relates generally to electrical assemblies and, more particularly, to an electrical assembly for a vehicle.

Some vehicles are designed with panels that include a latch configured to open the panel. In many vehicles, the latch is electro-mechanical and operated by remote activation via a switch control assembly. A circuit board is typically positioned within latch control assembly which may be located adjacent to a license plate holder of the vehicle. An actuator within the latch control assembly is configured to engage to the circuit board to operate the latch of the panel. Generally, a lighting system is also provided adjacent to the license plate holder to illuminate the license plate of the vehicle. The lighting system may also illuminate the actuator.

However, conventional panel assemblies are not without their disadvantages. In particular, the latch control assembly and the lighting system are typically configured as separate components. Specifically, the latch control assembly and the lighting system are separately powered and controlled. The latch control assembly may include a mechanical switch and the lighting system may be powered and controlled by the circuit board. Such a configuration requires additional wiring and components to be installed throughout the vehicle. The additional wiring and components may increase a probability of an electrical malfunction in the vehicle. Moreover, the additional wiring and components increases labor time and costs when assembling the vehicle.

In addition, conventional latch assemblies may not maintain a water tight seal. In particular, the additional components in the latch assemblies create crevices that may not be properly sealed. The crevices may allow water to seep into the panel. The water may damage the components of the latch assembly and/or the lighting system. Moreover, the water may seep into the vehicle itself thereby damaging the interior of the vehicle.

A need remains for an electronic assembly that operates a latch and a lighting system with minimal components. Another need remains for an electronic assembly that provides a water tight seal.

SUMMARY OF THE INVENTION

In one embodiment, a combination light and switch assembly for a panel of a vehicle is provided. The assembly includes a circuit board having an LED contact and a latch contact. The latch contact is configured to electrically couple to a latch of the panel. A LED is joined to the LED contact. The LED is configured to illuminate at least a portion of the panel. An actuator assembly is moveable toward the circuit board so that the actuator assembly engages the latch contact to operate the latch of the panel when the latch contact is engaged by the actuator assembly.

In another embodiment, a combination light and switch assembly for a panel of a vehicle is provided. The assembly includes a housing having an opening extending therethrough. The housing is configured to couple to the panel. A circuit board is provided having an LED contact and a latch contact. The latch contact is configured to electrically couple to a latch of the panel. A LED is joined to the LED contact. The LED is configured to illuminate at least a portion of the panel. An actuator assembly is accessible through the opening in the housing. The actuator assembly is moveable toward the circuit board so that the actuator assembly engages the latch contact to operate the latch of the panel when the latch contact is engaged by the actuator assembly.

In another embodiment, an assembly for a panel of a vehicle is provided. The assembly includes a housing having an opening extending therethrough. The housing is configured to couple to the panel. A combination light and switch assembly is provided including a circuit board having an LED contact and a latch contact. The latch contact is configured to electrically couple to a latch of the panel. A LED is joined to the LED contact. The LED is configured to illuminate at least a portion of the panel. An actuator assembly is accessible through the opening in the housing. The actuator assembly is moveable toward the circuit board so that the actuator assembly engages the latch contact to operate the latch of the panel when the latch contact is engaged by the actuator assembly. A boot is provided having a push button extending through the opening in the housing. The push button is aligned with the actuator assembly. The push button is configured to receive a force that moves the actuator assembly toward the circuit board. A cover is joined to the housing to enclose the light and switch assembly.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
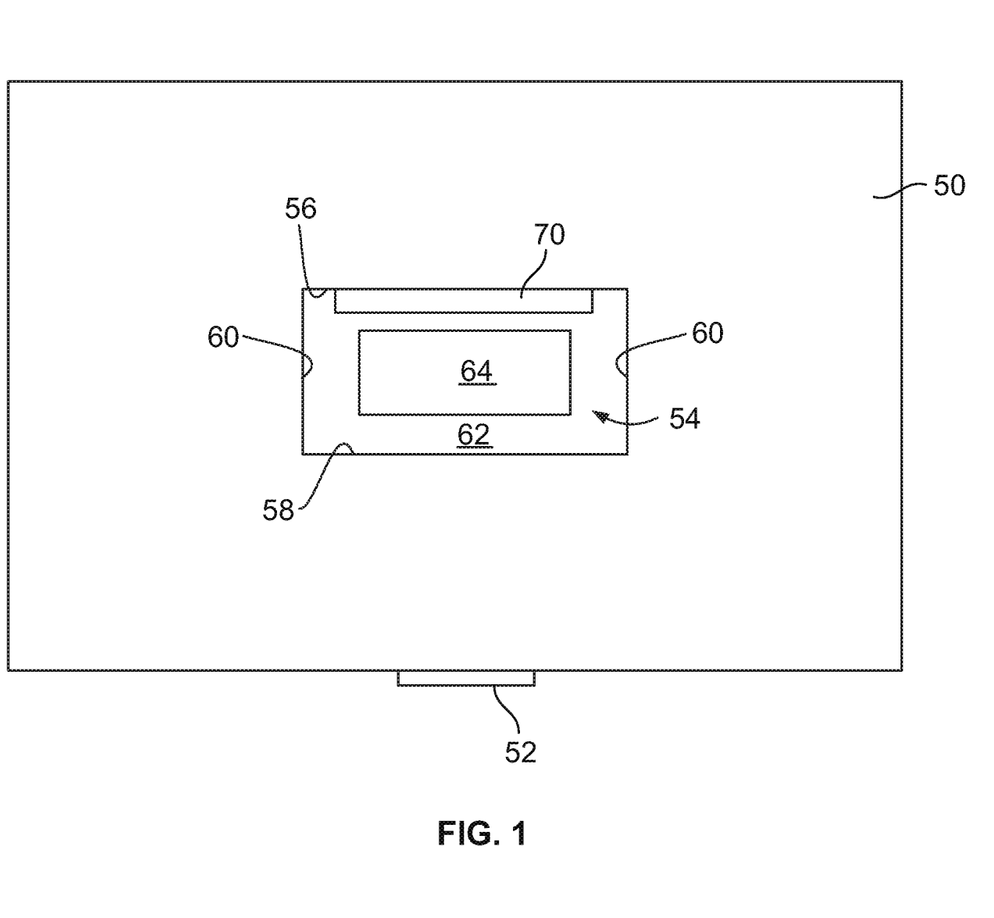
FIG. 1 is a front schematic view of a panel for a vehicle formed in accordance with an embodiment.

FIG. 1 illustrates a panel 50 for a vehicle (not shown) formed in accordance with an embodiment. The panel 50 may be a tail gate, door, or the like. The panel 50 is joined to the back end of a vehicle (not shown). The panel 50 includes a latch 52. In an exemplary embodiment, the latch 52 is an electronic latch. The latch 52 is configured to lock the panel 50 to the vehicle. A cavity 54 is located on the panel 50. The cavity 54 includes a top surface 56, a bottom surface 58, and a pair of side surfaces 60. A back surface 62 is formed between the surfaces 56, 58, and 60. A license plate 64 may be configured to be joined to the back surface 62.

A combination light and switch assembly 70 is located along the top surface 56 of the cavity 54. In an alternative embodiment, the assembly 70 may be located along the bottom surface 58 or one of the side surfaces 60. The assembly 70 is electrically joined to the latch 52. The assembly 70 is configured to operate the latch 52 so that the panel 50 can be opened. The electrical assembly is also configured to illuminate the cavity 54.

Figure 2:
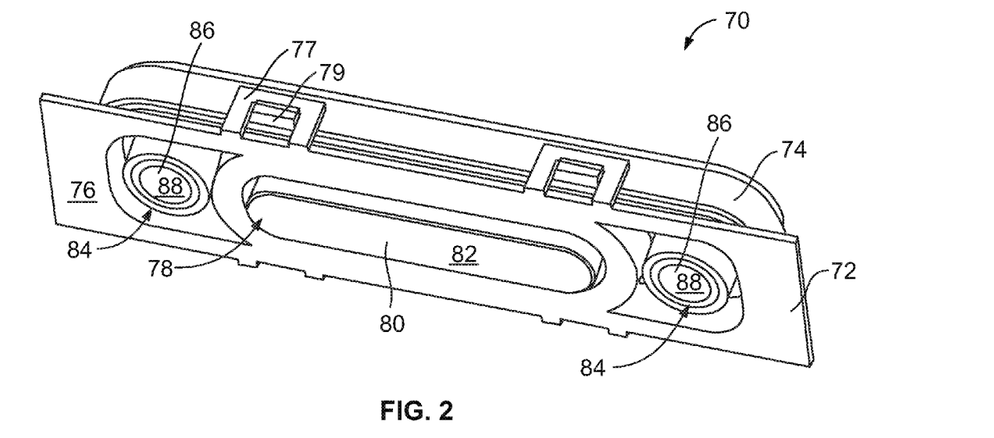
FIG. 2 is a bottom perspective view of a combination light and switch assembly formed in accordance with an embodiment.

FIG. 2 illustrates a bottom view of the assembly 70. The assembly 70 includes a housing 72 and a cover 74. The housing 72 includes latches 77 that engage tabs 79 formed on the cover 74 to join the housing 72 and the cover 74. The cover 74 is joined to the housing 72 to enclose components of the assembly 70. In another embodiment, the housing 72 and the cover 74 may include any corresponding coupling mechanisms.

The housing 72 includes a bottom surface 76. The assembly 70 is configured to be joined to the top surface 56 (shown in FIG. 1) of the cavity 54 (shown in FIG. 1) such that the bottom surface 76 of the housing 72 is accessible within the cavity 54. The bottom surface 76 of the housing 72 is configured to face the back surface 62. In one embodiment, the cover 74 of the assembly 70 is coupled to the top surface 56 of the cavity 54. Alternatively, the top surface 56 may include an opening (not shown) configured to receive the assembly 70. The cover 74 of the electrical assembly may be inserted into the opening so that the bottom surface 76 of the housing 72 extends along the top surface 56 of the cavity 54. Alternatively, the cover may be inserted into the opening so that the bottom surface 76 of the housing is flush with the top surface 56 of the cavity 54.

The housing 72 includes an opening 78 extending therethrough. The opening 78 extends through the bottom surface 76 of the housing 72. A push button 80 extends through the opening 78. The push button 80 includes a push surface 82. The push button 80 is illustrated as extending beyond the bottom surface 76 of the housing 72. Alternatively, the push surface 82 may be flush with the bottom surface 76 of the housing 72. In another embodiment, the push surface 82 may be recessed into the opening 78 formed in the housing 72. The push button 80 is configured to operate the latch 52 of the panel 50.

The housing 72 includes apertures 84 extending therethrough. The apertures 84 extend through the bottom surface 76 of the housing 72. The apertures 84 retain lenses 86 therein. The lenses 86 have an end surface 88. The end surface 88 of each lens is positioned flush with the bottom surface 76 of the housing 72. Alternatively, the end surface 88 of each lens 86 may extend beyond the bottom surface 76 or be recessed within the bottom surface 76 of the housing 72. The illustrated embodiment includes two lenses 86. Optionally, the assembly 70 may include one or more than two lenses 86. The lenses 86 are positioned on each side of the push button 80. In another embodiment, the lenses 86 may have any orientation with respect to the push button 80. In one embodiment, the push button 80 may include a lens 86. The lenses 86 are configured to illuminate the cavity 54.

Figure 3:
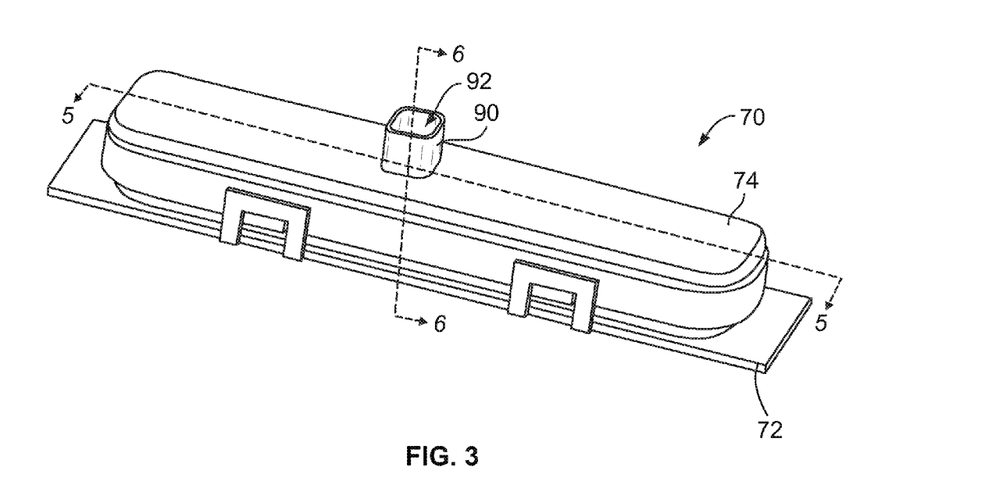
FIG. 3 is a top perspective view of the assembly shown in FIG. 2.

FIG. 3 illustrates a top view of the assembly 70. The cover 74 includes a hollow tube 90 extending therefrom. The hollow tube 90 includes an opening 92 extending therethrough. The opening 92 may be configured to receive wires and/or electrical components configured to power and operate the assembly 70. The hollow tube 90 may be a molded-in connector formed in the top surface 56 (shown in FIG. 1) of the cavity 54 (shown in FIG. 1) to retain the electrical assembly within the panel 50 (shown in FIG. 1). Alternatively, the cover 74 and/or the housing 72 may include any suitable attachment mechanisms to retain the assembly 70 within the panel 50.

Figure 4:
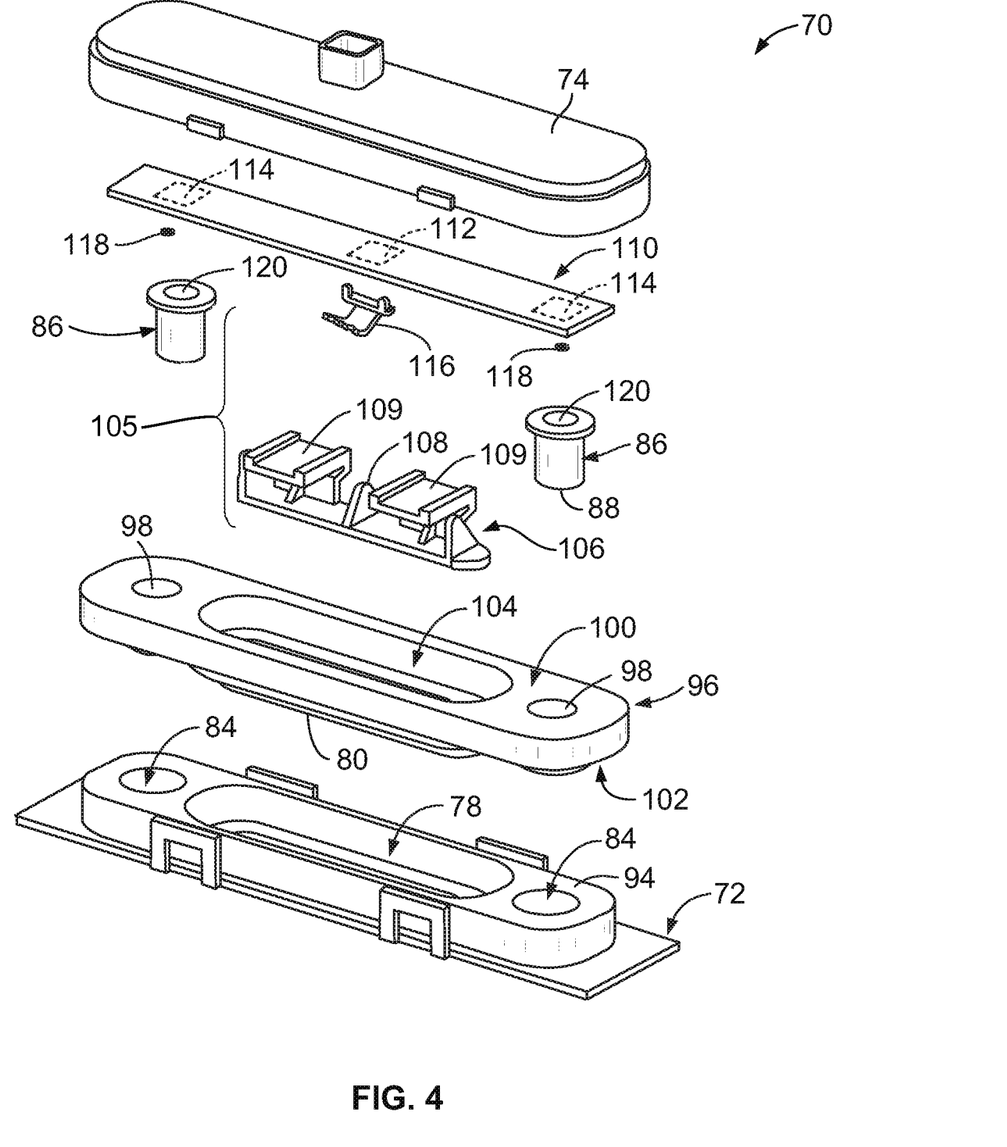
FIG. 4 is an exploded view of the assembly shown in FIGS. 2 and 3.

FIG. 4 illustrates an exploded view of the assembly 70. The housing 72 includes a top surface 94. The opening 78 and the apertures 84 of the housing 72 extend through the top surface 94. A boot 96 is provided having a top 100 and a bottom 102. The boot 96 is configured to be positioned on the top surface 94 of the housing 72. The bottom 102 of the boot 96 abuts the top surface 94 of the housing 72. The boot 96 is formed from a flexible material, for example, clear silicone, polyurethane, or the like. The boot 96 is joined to the housing 72 to create a water-tight seal for the assembly 70. The boot 96 includes apertures 98 extending from the top 100 of the boot 96 to the bottom 102 of the boot 96. The apertures 98 are configured to align with the apertures 84 of the housing. The lenses 86 are received through the apertures 98 and the apertures 84 so that the end surface 88 of each lens is positioned flush with the bottom surface 76 of the housing 72.

The boot 96 includes a cavity 104 formed therein. The cavity 104 is open along the top 100 of the boot 96. The push button 80 extends across the cavity 104 along the bottom 102 of the boot 96. The push button 80 seals the cavity 104 along the bottom of the boot 96. The cavity 104 is aligned with the opening 78 of the housing 72 so that the push button 80 extends through the opening 78. The cavity 104 is configured to receive an actuator assembly 105 therein. The actuator assembly 105 includes an actuator 106 that is configured to move within the cavity 104 when a force is applied to the push button 80. The actuator 106 includes a prong 108 and a pair of arms 109. The prong 108 is configured to operate the latch 52 of the panel 50. The arms 109 are configured to position the actuator 106 within the assembly 70.

The assembly 70 includes a circuit board 110. In an exemplary embodiment, the circuit board 110 is a printed circuit board. The circuit board 110 is electrically coupled to a power system of the vehicle (not shown). The circuit board 110 is configured with electrical components (not shown) thereon. The electrical components power and operate the assembly 70. The circuit board 110 includes a latch contact 112 and LED contacts 114. The latch contact 112 is electrically coupled to the latch 52 (shown in FIG. 1) of the panel 50 (shown in FIG. 1).

The latch contact 112 is aligned with the prong 108 of the actuator 106. The actuator assembly 105 includes a contact spring 116 is positioned between the latch contact 112 and the prong 108. The contact spring 116 is configured to couple to the circuit board 110 so that the contact spring 116 aligns with the latch contact 112. The actuator 106 is configured to be moved toward the circuit board 110 when a force is applied to the push button 80. As the actuator 106 moves toward the circuit board 110, the actuator is configured to engage the contact spring 116. The contact spring 116 engages the latch contact 112 to operate the latch 52 of the panel 50.

The LED contacts 114 are electrically joined to LEDs 118. Each LED 118 is aligned with a lens 86. The lenses 86 include apertures 120 extending therethrough. The LEDs 118 are aligned with the aperture 120 of the respective lens 86. The circuit board 110 powers the LEDs 118 to direct light through the lenses 86. The LEDs 118 illuminate the cavity 54 of the panel 50.

The cover 74 couples to the housing 72 to retain the circuit board 110, LEDs 118, contact spring 116, actuator 106, and boot 96 therein. The boot 96 seals the assembly 70 to provide a water-tight interface. The assembly 70 provides power to and operates both the latch 52 and the LEDs 118 of the panel 50.

Figure 5:
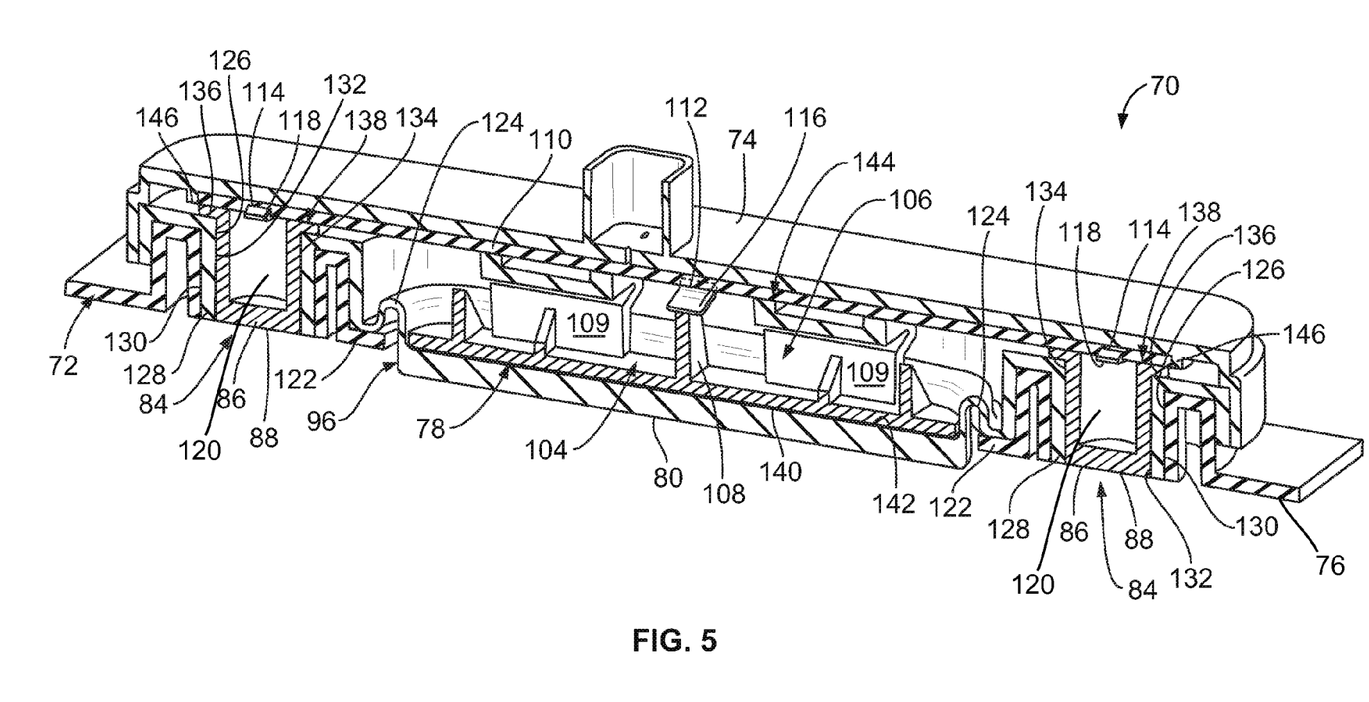
FIG. 5 is a cross-sectional view of the assembly shown in FIG. 3 taken about line 5-5.

FIG. 5 illustrates a cross-sectional view of the assembly 70 taken along line 5-5 shown in FIG. 3. The boot 96 is joined to the housing 72 such that the push button 80 extends through the opening 78 of the housing 72. The housing 72 includes a flange 122 that extends around the opening 78. The boot 96 includes a lip 124 formed around the push button 80. The lip 124 of the boot 96 abuts the flange 122 of the housing 72. The lip 124 is sealed to the flange 122 to create a water tight interface between the boot 96 and the housing 72. In one embodiment, the interface between the lip 124 and the flange 122 may be air tight. The interface between the lip 124 and the flange 122 prevents water from entering the assembly 70.

The apertures 84 of the housing 72 include an inner surface 126. The boot 96 includes lens receptacles 128. The apertures 98 of the boot 96 extend through the lens receptacles 128. The lens receptacles 128 include an outer surface 130 and an inner surface 132. The inner surface 132 of the lens receptacles 128 is defined by the apertures 98. The outer surface 130 of each lens receptacle 128 abuts the inner surface 126 of an aperture 84 of the housing 72. The outer surface 130 of the lens receptacle 128 forms a water tight interface with the inner surface 126 of the housing aperture 84. In one embodiment, the interface formed between the outer surface 130 of the lens receptacle 128 and the inner surface 126 of the aperture may be air tight.

A lens 86 is positioned within each lens receptacle 128. The lens 86 is positioned so that the end surface 88 of the lens 86 is positioned flush with the bottom surface 76 of the housing 72. The lens 86 includes an outer surface 134 that extends around a perimeter of the lens 86. The outer surface 134 of the lens 86 abuts the inner surface 132 of the lens receptacle 128 to form a water tight interface between the lens 86 and the boot 96. In one embodiment, the interface between the outer surface 134 of the lens 86 and the inner surface 132 of the lens receptacle 128 may be air tight. The lens 86 includes a lip 136 extending along a top 138 of the lens 86. The lip 136 abuts the top 100 of the boot 96 and forms an air tight and/or water tight interface.

The actuator 106 is positioned within the cavity 104 of the push button 80. The actuator 106 includes a bottom surface 140 and the cavity 104 includes an inner surface 142 that extends along the push button 80. The actuator 106 rests in the cavity 104 such that the bottom surface 140 of the actuator 106 abuts the inner surface 142 of the cavity 104. The lip 124 of the boot 96 extends around the actuator 106.

The circuit board 110 is joined to the cover 74. The cover 74 includes a recess 144 formed between a pair of tabs 146. The circuit board 110 is retained within the recess 144. The latch contact 112 and the LED contacts 114 of the circuit board 110 face downward toward the housing 72 of the assembly 70. The LEDs 118 are joined to the LED contacts 114. The LEDs 118 are aligned with the apertures 120 of the lens 86 to direct light through the lenses 86. The contact spring 116 is joined to the circuit board 110. The contact spring 116 is aligned with latch contact 112 of the circuit board 110. The prong 108 of the actuator 106 engages the contact spring 116. The arms 109 of the actuator 106 engage the circuit board 110 to position the actuator 106 within the assembly 70.

Figure 6:
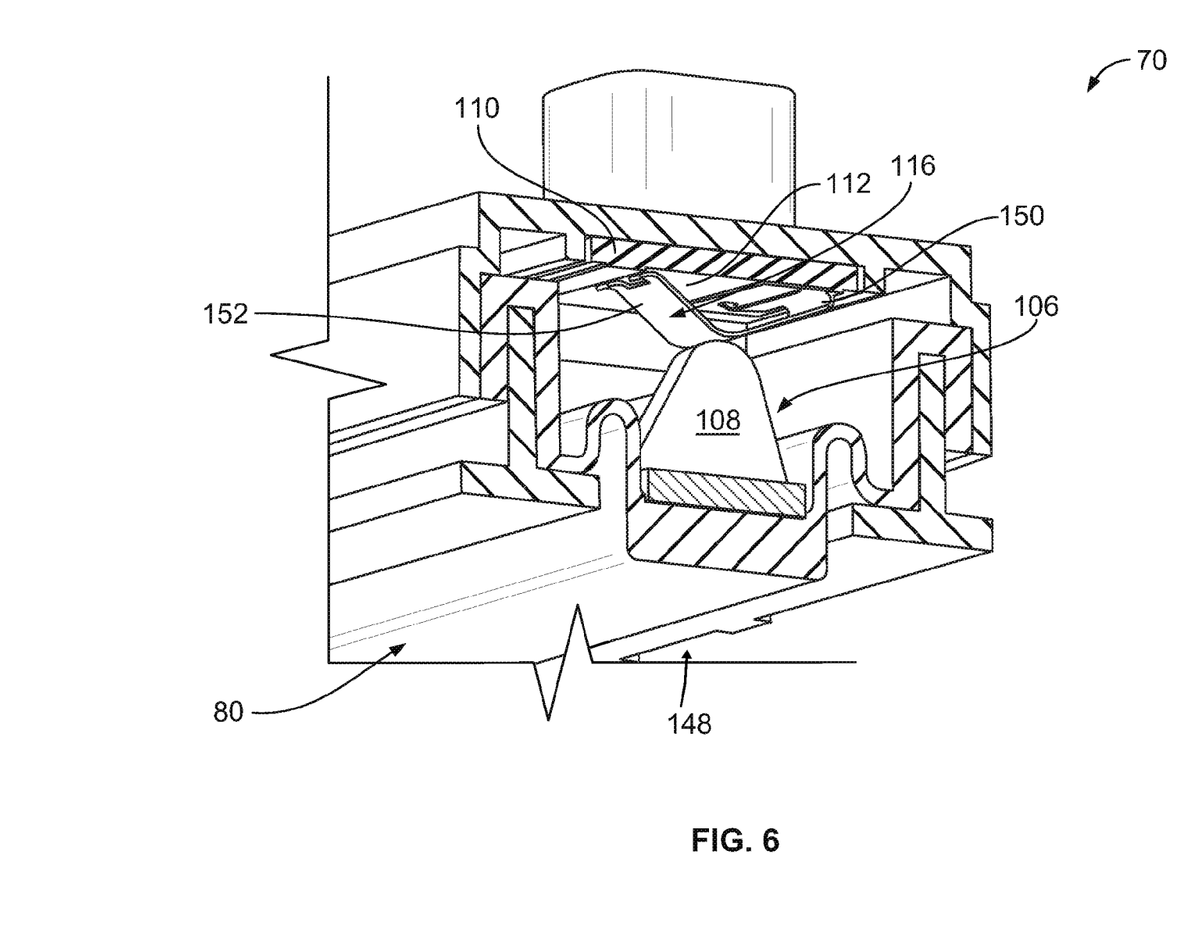
FIG. 6 is a cross-sectional view of the assembly shown in FIG. 3 taken about line 6-6.

FIG. 6 is a cross-sectional view of the assembly 70 taken about line 6-6 shown in FIG. 3. The push button 80 is configured to receive a force in the direction of arrow 148. The force on the push button 80 generates a force on the actuator 106. The actuator 106 may be formed from an elastic material. For example, in one embodiment, the actuator may be formed from polyoxymethylene. The actuator 106 may be configured to deform under the force. In another embodiment, the actuator 106 may utilize springs or the like. The actuator 106 may deform so that the prong 108 of the actuator engages the contact spring 116.

The contact spring 116 includes a support end 150 and a connection end 152. The support end 150 is fixed to the circuit board 110. The connection end 152 is aligned with the latch contact 112 of the circuit board 110. As the prong 108 of the actuator engages the contact spring 116, the connection end 152 of the contact spring 116 is moved into contact with the latch contact 112 of the circuit board 110, as illustrated in FIG. 6. The connection end 152 of the contact spring 116 forms an electrical connection with the latch contact 112 of the circuit board 110. The electrical connection between the latch contact 112 and the contact spring 116 operates the latch 52 of the panel 50.

After the latch 52 of the panel 50 is operated, the force on the push button 80 is removed. The actuator 106 moves back to its original location and the connection end 152 of the contact spring 116 is removed from contact with the latch contact 112. The latch 52 of the tail gate resets for subsequent uses.

Figure 7:
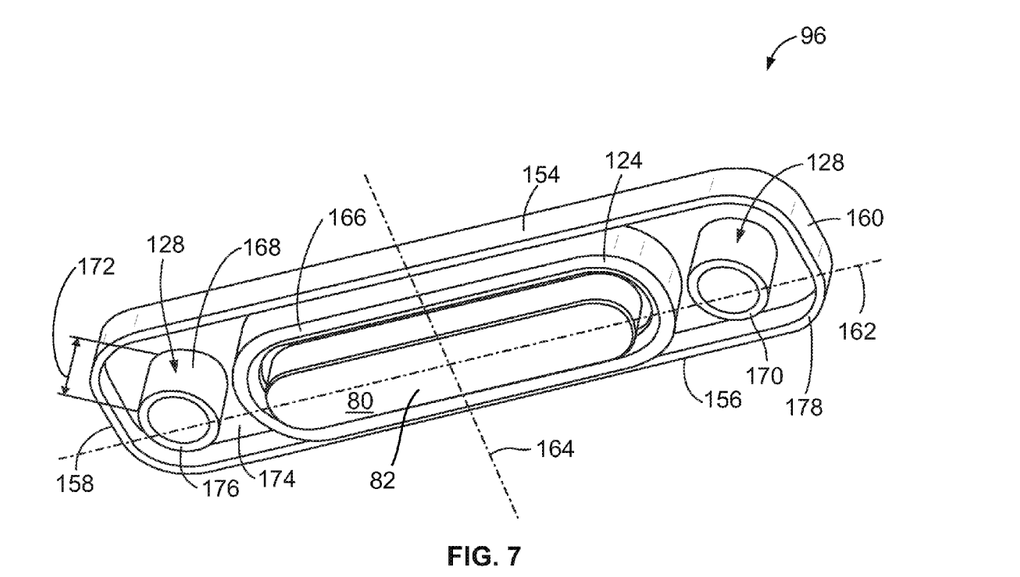
FIG. 7 is a bottom perspective view of a boot formed in accordance with the embodiment of FIG. 1.

FIG. 7 illustrates a bottom perspective view of the boot 96. The boot 96 includes a front 154 and a back 156. A first side 158 and a second side 160 extend between the front 154 and the back 156. A longitudinal axis 162 extends from the first side 158 to the second side 160. The longitudinal axis 162 is centered between the front 154 and the back 156. A lateral axis 164 extends between the front 154 and the back 156. The lateral axis 164 is centered between the first side 158 and the second side 160.

The push button 80 extends lengthwise along the longitudinal axis 162. The push button 80 is centered between the first side 158 and the second side 160 of the boot 96. The push button 80 is centered between the front 154 and the back 156 of the boot 96. In an alternative embodiment, the push button 80 may extend lengthwise along the lateral axis 164. Optionally, the push button 80 may be positioned at any intermediate location between the first side 158 and the second side 160 of the boot 96. The push button 80 may also be positioned at any intermediate location between front 154 and the back 156 of the boot 96. Alternatively, the push button 80 may be oriented at an angle with respect to the longitudinal axis 162 and/or the lateral axis 164.

The lip 124 of the boot 96 extends around the push button 80. The push button 80 is centered within the lip 124. The lip 124 includes a bottom surface 166. The push surface 82 of the push button 80 extends beyond the bottom surface 166 of the lip 124. Optionally, the push surface 82 of the push button 80 may be flush with the bottom surface 166 of the lip 124. In another embodiment, the push surface 82 of the push button 80 may be recessed with respect to the bottom surface 166 of the lip 124.

The lens receptacles 128 are positioned along the longitudinal axis 162. The lens receptacles 128 are centered between the front 154 and the back 156 of the boot 96. Alternatively, the lens receptacle 128 may be positioned at any intermediate location between the front 154 and the back 156 of the boot 96. A first lens receptacle 168 is positioned between the push button 80 and the first side 158 of the boot 96. A second lens receptacle 170 is positioned between the push button 80 and the second side 160 of the boot 96. In one embodiment, any number of lens receptacles 128 may be positioned at any intermediate location between the first side 158 and the second side 160 of the boot 96. In another embodiment, lens receptacles 128 may be positioned between the push button 80 and the front 154 of the boot 96 and/or between the push button 80 and the back 156 of the boot 96.

The lens receptacles 128 are illustrated as being circular. Alternatively, the lens receptacles 128 may have any shape that corresponds to a shape of the lenses 86 (shown in FIG. 4). For example, the lens receptacles 128 may be squared to accommodate square lenses 86. The lens receptacles 128 have a length 172 defined between a surface 174 of the boot 96 and an end 176 of the lens receptacle 128. The length 172 of the lens receptacle 128 is configured such that the end surface 88 (shown in FIG. 4) of the lens 86 is flush with the end 176 of the lens receptacle 128 when the lens 86 is positioned within the lens receptacle 128. Alternatively, the length 172 of the lens receptacle 128 may be configured such that the end surface 88 of the lens 86 extends beyond the end 176 of the lens receptacle 128. In another embodiment, the end surface 88 of the lens 86 may be configured to be recessed within the lens receptacle 128.

The boot 96 includes an outer flange 178. The outer flange 178 extends around a perimeter of the boot 96. The outer flange 178 is configured to engage the housing 72 (shown in FIG. 4) to seal the boot 96 to the housing 72.

Figure 8:
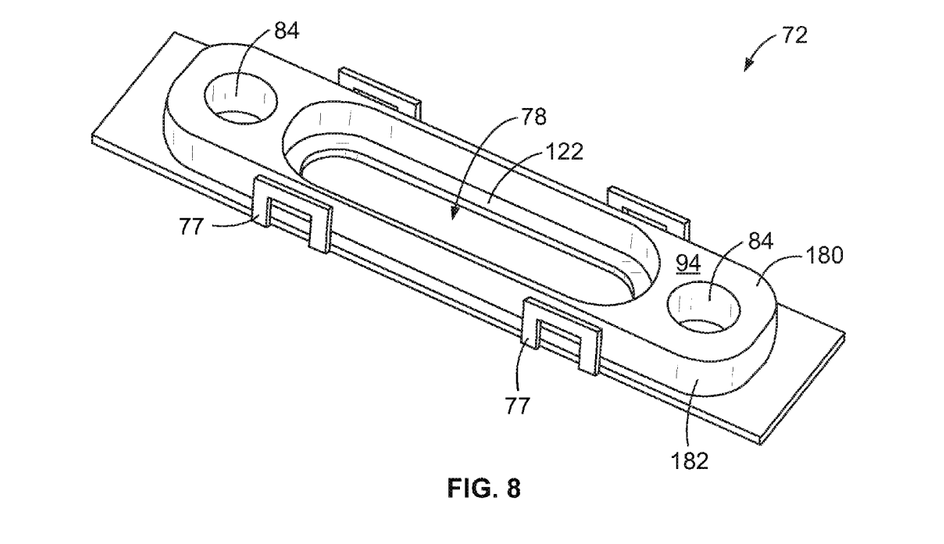
FIG. 8 is a top perspective view of a housing formed in accordance with the embodiment of FIG. 1.

FIG. 8 illustrates a top perspective view of the housing 72. The housing 72 includes a sealing area 180. The sealing area 180 is configured to engage and seal to the boot 96 (shown in FIG. 7). The sealing area 180 includes an outer surface 182 and the top surface 94 of the housing 72. The flange 178 (shown in FIG. 7) of the boot 96 is configured to abut the outer surface 182 of the sealing area 180 to seal the boot 96 to the housing 72. The surface 174 (shown in FIG. 7) of the boot 96 is configured to engage and seal to the top surface 94 of the sealing area 180.

The opening 78 of the housing 72 extends through the sealing area 180. The flange 122 extends around the opening 78. When the boot 96 is sealed to the sealing area 180, the push button 80 is configured to extend through the opening 78. The lip 124 extending around the push button 80 engages and seals to the flange 122. The orientation of the opening 78 corresponds to the orientation of the push button 80. As described above, the orientation of the push button 80 may vary. The orientation of the opening 78 is selected to align with the push button 80.

The apertures 84 of the housing 72 extend through the sealing area 180. The apertures 84 are configured to receive the lens receptacles 128 such that a seal is formed between the apertures 84 and the lens receptacles 128. The number of apertures 84 is configured to correspond to the number of lens receptacles 128 of the boot 96. As described above, the number of lens receptacles 128 may vary. The number of apertures 84 is selected based on the number of lens receptacles 128 provided on the boot 96. The orientation of the apertures 84 is selected based on the orientation of the lens receptacles 128.

The housing 72 includes latches 77. The latches 77 are configured to engage the tabs 79 of the cover 74; as illustrated in FIG. 2. Alternatively, the housing 72 and the cover 74 may include any corresponding coupling mechanisms configured to join the housing 72 and the cover 74.

Figure 9:
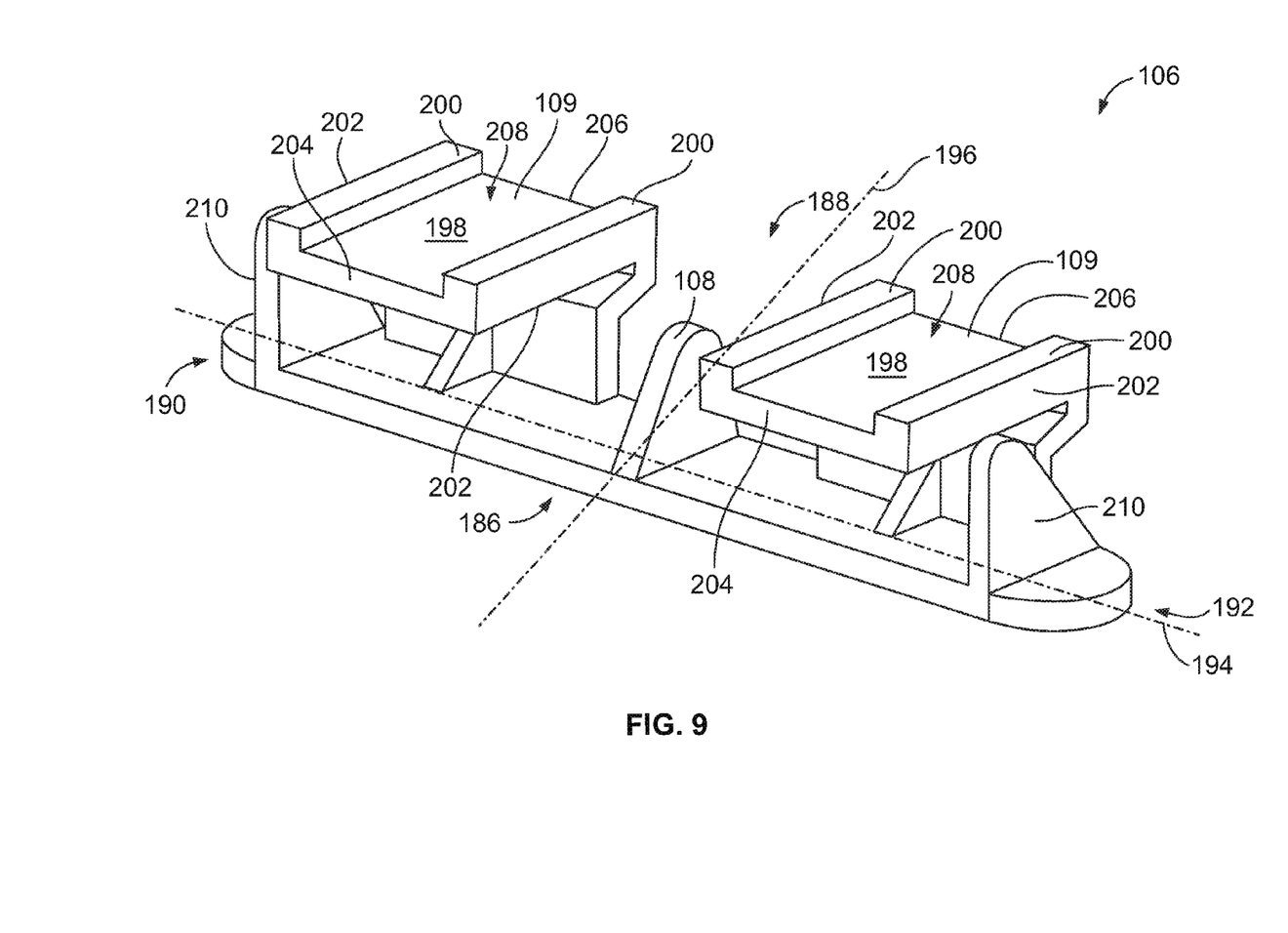
FIG. 9 is a top perspective view of an actuator formed in accordance with the embodiment of FIG. 1.

FIG. 9 illustrates a top perspective view of the actuator 106. The actuator 106 includes a front 186 and a back 188. A first side 190 and a second side 192 extend between the front 186 and the back 188. A longitudinal axis 194 extends between the first side 190 and the second side 192. The longitudinal axis 194 is centered between the front 186 and the back 188. A lateral axis 196 extends between the front 186 and the back 188. The lateral axis 196 is centered between the first side 190 and the second side 192.

The prong 108 of the actuator 106 extends along the lateral axis 196 from the front 186 to the back 188 of the actuator 106. Optionally, the prong 108 may extend along the longitudinal axis 194. The prong 108 is centered between the first side 190 and the second side 192. In another embodiment, the prong 108 may be positioned at any intermediate location between the first side 190 and the second side 192. The prong 108 may be positioned at any intermediate location between the front 186 and the back 188 of the actuator 106.

Arms 109 are positioned on each side of the prong 108. One arm 109 is positioned between the prong 108 and the first side 190 of the actuator 106. Another arm 109 is positioned between the prong 108 and the second side 192 of the actuator 106. In one embodiment, the actuator 106 includes any number arms 109. An arm 109 may be positioned at any intermediate location between the front 186 and the back 188 of the actuator 106. An arm 109 may be positioned at any intermediate location between the first side 190 and the second side 192 of the actuator 106. The arms 109 are positioned to align with spaces between the latch contact 112 and the LED contacts 114.

Each arm 109 includes a top surface 198 having sides 202, a front 204, are a back 206. Ribs 200 are formed on the top surface 198. The illustrated embodiment includes two ribs 200 on each arm 109. Optionally, the top surface 198 may include any number of ribs 200. The ribs 200 are positioned along the sides 202 of the top surface 198. Alternatively, the ribs 200 may be formed at the front 204 and/or the back 206 of the top surface 198. In one embodiment, the ribs 200 may be formed at any intermediate location between the sides 202 of the top surface 198 and/or any intermediate location between the front 204 and the back 206 of the top surface 198. The ribs 200 are configured to engage the circuit board 110 (shown in FIG. 4) to position the actuator 106 within the assembly 70.

A recess 208 is formed between the ribs 200. The recess 208 does not engage the circuit board 110. The recess 208 provides clearance for components on the circuit board 110. The components of the circuit board 110 are aligned with the recess 208. When the actuator 106 deforms to engage the latch contact 112 (shown in FIG. 4) of the circuit board 110, the recess 208 prevents the top surface 198 of the actuator 106 from contacting the components of the circuit board 110.

The actuator 106 includes two stops 210. Alternatively, the actuator 106 may include any number of stops 210. One of the stops 210 is positioned adjacent the first side 190 of the actuator 106. The other stop 210 is positioned adjacent the second side 192 of the actuator 106. In one embodiment, a stop 210 is located at any intermediate position between the first side 190 and the second side 192 of the actuator 106. A stop 210 may be positioned at any intermediate location between the front 186 and the back 188 of the actuator 106. The stops 210 are configured to engage the circuit board 110 when the actuator 106 is deformed to activate the latch contact 112. The stops 210 limit the movement of the actuator 106 toward the circuit board 110 so that the actuator 106 does not contact any components of the circuit board 110.

Figure 10:
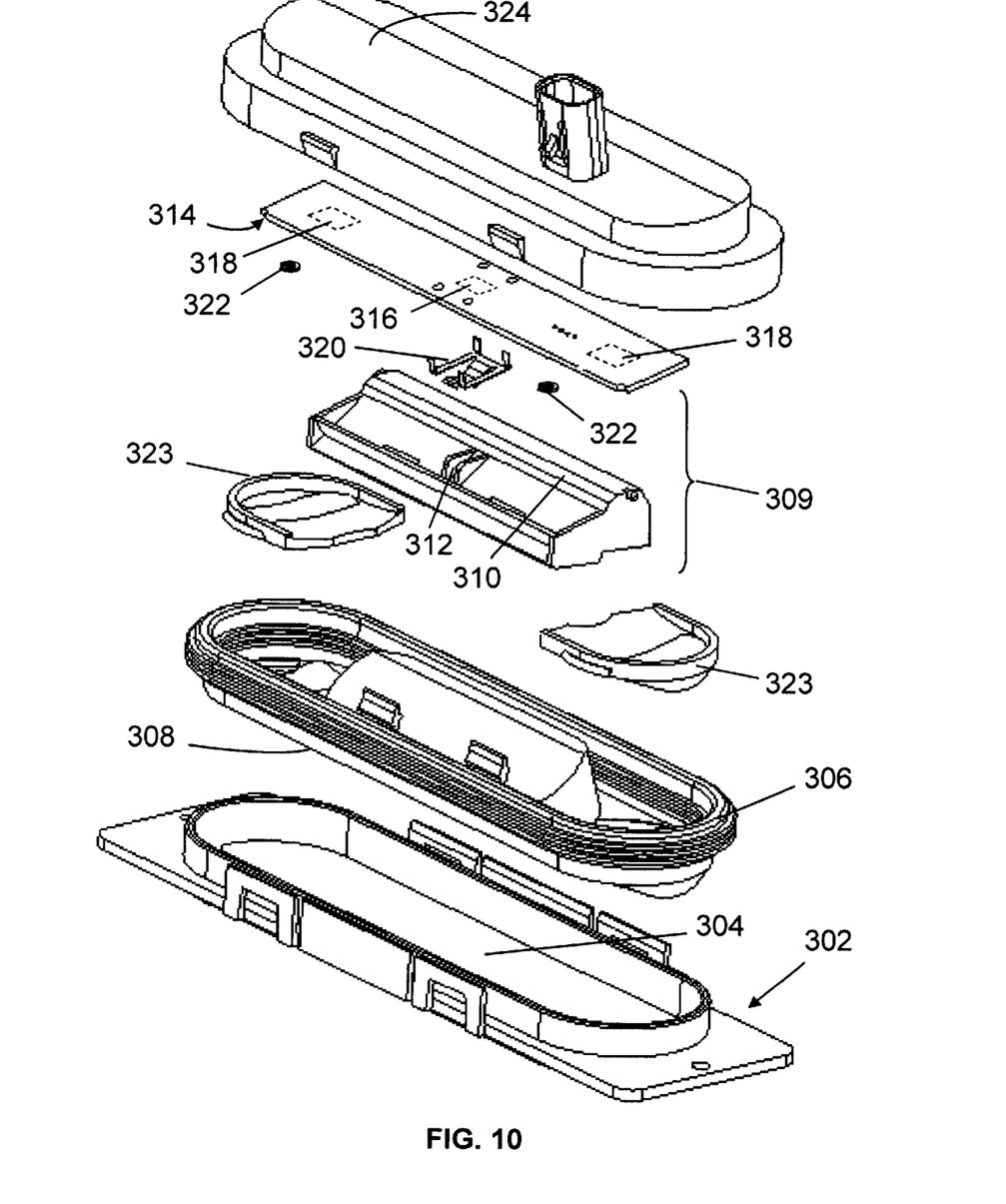
FIG. 10 is an exploded view of a combination light and switch assembly formed in accordance with another embodiment.

FIG. 10 illustrates an exploded view of a combination light and switch assembly 300 formed in accordance with another embodiment. The assembly 300 includes a housing 302 having an opening 304 extending therethrough. A boot 306 is configured to be positioned within the housing 302. The boot 306 is formed from a flexible material, for example, clear silicone, polyurethane, or the like. The boot 306 is transparent and capable of allowing light to pass therethrough. The boot 306 is joined to the housing 302 to create a water-tight seal for the assembly 300.

The boot 306 includes a push button 308 extending therefrom. The push button 308 is centered within the boot 306. The push button 308 is configured to receive an actuator assembly 309 thereon. The actuator assembly 309 includes an actuator 310 is configured to move within the assembly 300 when a force is applied to the push button 308. The actuator 310 includes a prong 312 that is configured to operate the latch 52 of the panel 50.

The assembly 300 includes a circuit board 314. In an exemplary embodiment, the circuit board 314 is a printed circuit board. The circuit board 314 is electrically coupled to a power system of the vehicle (not shown). The circuit board 314 is configured with electrical components (not shown) thereon. The electrical components power and operate the assembly 300. The circuit board 314 includes a latch contact 316 and LED contacts 318. The latch contact 316 is electrically coupled to the latch 52 (shown in FIG. 1) of the panel 50 (shown in FIG. 1).

The latch contact 316 is aligned with the prong 312 of the actuator 310. The actuator assembly 309 includes a contact spring 320 positioned between the latch contact 316 and the prong 312. The contact spring 320 is configured to couple to the circuit board 314 so that the contact spring 320 aligns with the latch contact 316. The actuator 310 is configured to be moved toward the circuit board 314 when a force is applied to the push button 308. As the actuator 310 moves toward the circuit board 314, the actuator 310 is configured to engage the contact spring 320. The contact spring 320 engages the latch contact 316 to operate the latch 52 of the panel 50.

The LED contacts 318 are electrically joined to LEDs 322. The circuit board 314 powers the LEDs 322 to direct light through lenses 323. The lenses 323 focus the light from the LEDs 322 and direct the light through the transparent boot 306. In one embodiment, the lenses 323 also provide support for the transparent boot 306. The LEDs 322 illuminate the cavity 54 of the panel 50.

A cover 324 couples to the housing 302 to retain the circuit board 314, LEDs 322, contact spring 320, actuator 310, and boot 306 therein. The boot 306 seals the assembly 300 to provide a water-tight interface. The assembly 300 provides power to and operates both the latch 52 and the LEDs 322 of the panel 50.

Figure 11:
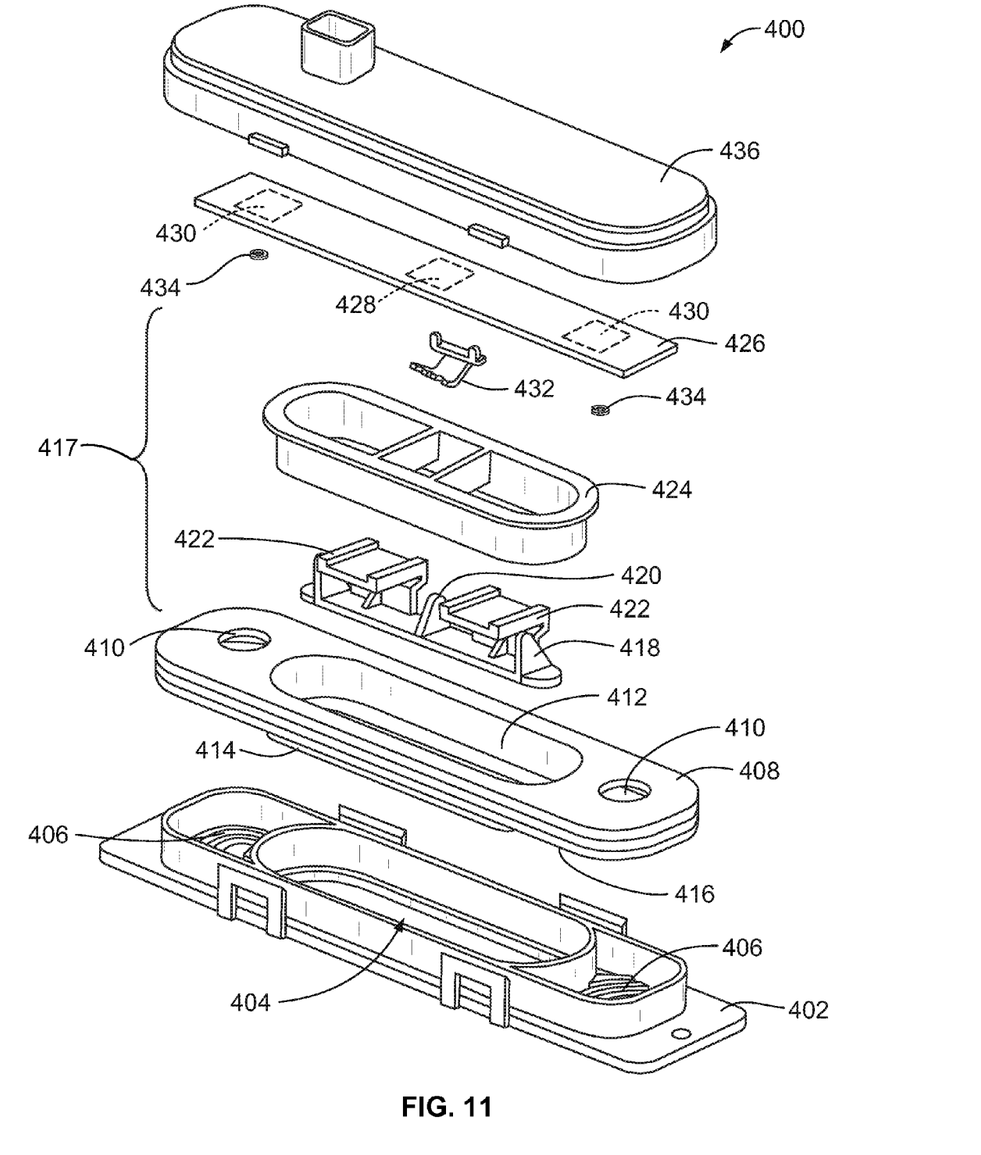
FIG. 11 is an exploded view of a combination light and switch assembly formed in accordance with another embodiment.

FIG. 11 illustrates an exploded view of a combination light and switch assembly 400 formed in accordance with another embodiment. The assembly 400 includes a housing 402 having an opening 404 and lenses 406 extending therethrough. The lenses 406 are positioned adjacent the opening 404. A boot 406 is configured to be positioned within the housing 402. The boot 408 is formed from a flexible material, for example, silicone, polyurethane, or the like. The boot 408 is joined to the housing 402 to create a water-tight seal for the assembly 400. The boot 408 includes apertures 410 extending therethrough. The apertures 410 are configured to align with the lenses 406.

The boot 408 includes a cavity 412 formed therein. A push button 414 extends across the cavity 412 along a bottom 416 of the boot 408. The push button 414 seals the cavity 412 along the bottom 416 of the boot 408. The cavity 412 is aligned with the opening 404 of the housing 402 so that the push button 414 extends through the opening 404. The cavity 412 is configured to receive an actuator assembly 417 therein. The actuator assembly 417 includes an actuator 418 that is configured to move within the cavity 412 when a force is applied to the push button 414. The actuator 418 includes a prong 420 and a pair of arms 422. The prong 420 is configured to operate the latch 52 of the panel 50. The arms 422 are configured to position the actuator 418 within the assembly 400. The actuator assembly 417 includes a retainer 424. The actuator 418 is held in position by a retainer 424 that is positioned around the actuator 418.

The assembly 400 includes a circuit board 426. In an exemplary embodiment, the circuit board 426 is a printed circuit board. The circuit board 426 is electrically coupled to a power system of the vehicle (not shown). The circuit board 426 is configured with electrical components (not shown) thereon. The electrical components power and operate the assembly 400. The circuit board 426 includes a latch contact 428 and LED contacts 430. The latch contact 428 is electrically coupled to the latch 52 (shown in FIG. 1) of the panel 50 (shown in FIG. 1).

The latch contact 428 is aligned with the prong 420 of the actuator 418. The actuator assembly 417 includes a contact spring 432 positioned between the latch contact 428 and the prong 420. The contact spring 432 is configured to couple to the circuit board 426 so that the contact spring 432 aligns with the latch contact 428. The actuator 418 is configured to be moved toward the circuit board 426 when a force is applied to the push button 414. As the actuator 418 moves toward the circuit board 426, the actuator 418 is configured to engage the contact spring 432. The contact spring 432 engages the latch contact 428 to operate the latch 52 of the panel 50.

The LED contacts 430 are electrically joined to LEDs 434. Each LED 434 is aligned with a lens 406. The LEDs 434 transmit light through the apertures 410 of the boot 408 to direct light through the lenses 406. The LEDs 434 illuminate the cavity 54 of the panel 50.

A cover 436 couples to the housing 402 to retain the circuit board 426, LEDs 434, contact spring 432, actuator 418, and boot 408 therein. The boot 408 seals the assembly 400 to provide a water-tight interface. The assembly 400 provides power to and operates both the latch 52 and the LEDs 434 of the panel 50.

Figure 12:
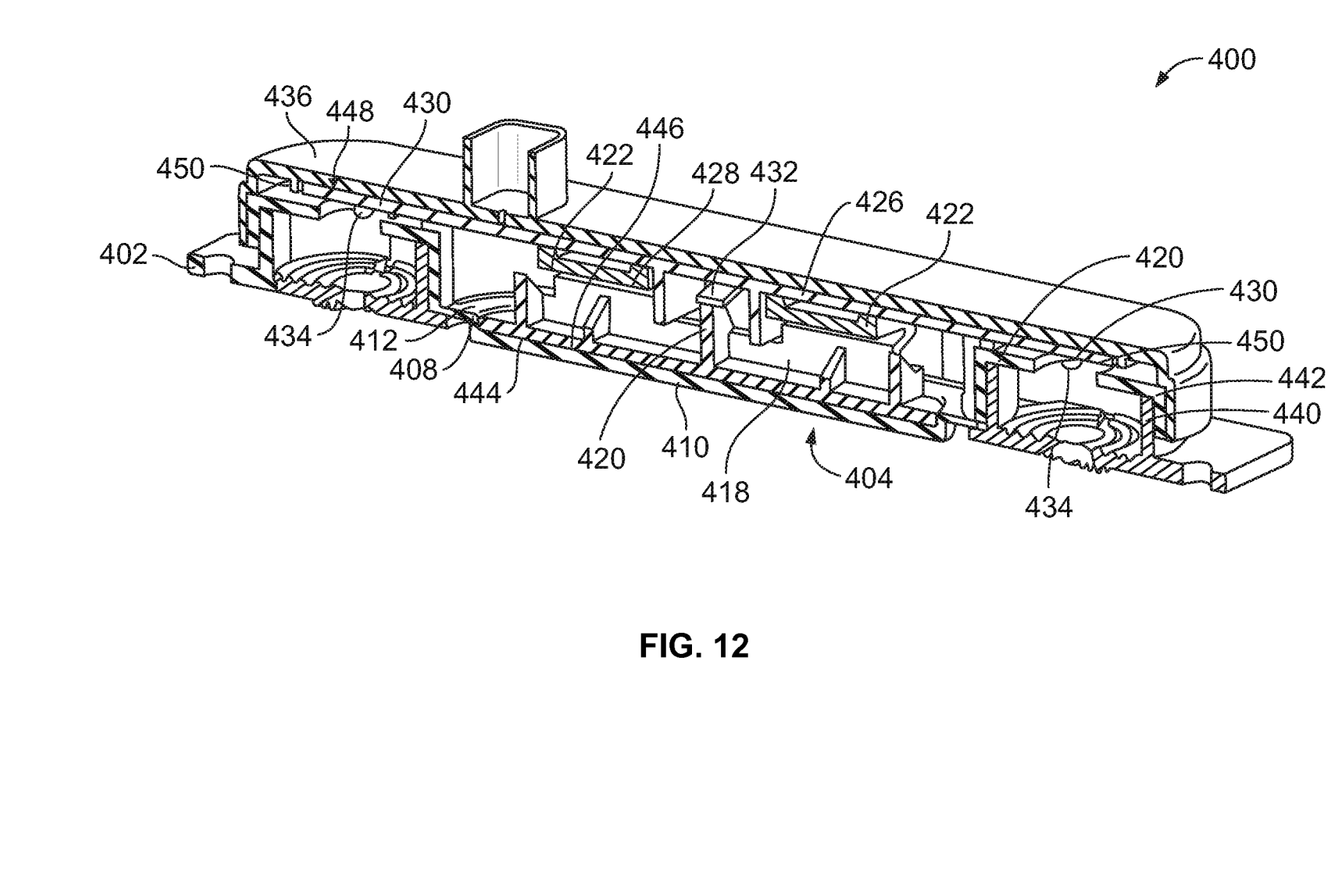
FIG. 12 is a cross-sectional view of the assembly shown in FIG. 11.

FIG. 12 illustrates a cross-sectional view of the assembly 400. The boot 408 is joined to the housing 402 such that the push button 410 extends through the opening 404 of the housing 402. The housing 402 includes a flange 440 that extends around the opening 404. The boot 408 includes a lip 442 formed around the push button 410. The lip 442 of the boot 408 abuts the flange 440 of the housing 402. The lip 442 is sealed to the flange 440 to create a water tight interface between the boot 408 and the housing 402. In one embodiment, the interface between the lip 442 and the flange 440 may be air tight. The interface between the lip 442 and the flange 440 prevents water from entering the assembly 400.

The actuator 418 is positioned within the cavity 412 of the push button 414. The actuator 418 includes a bottom surface 444 and the cavity 412 includes an inner surface 446 that extends along the push button 410. The actuator 418 rests in the cavity 412 such that the bottom surface 444 of the actuator 418 abuts the inner surface 446 of the cavity 412. The retainer 420 extends around the actuator 418.

The circuit board 426 is joined to the cover 436. The cover 436 includes a recess 448 formed between a pair of tabs 450. The circuit board 426 is retained within the recess 448. The latch contact 428 and the LED contacts 430 of the circuit board 426 face downward toward the housing 402 of the assembly 400. The LEDs 434 are joined to the LED contacts 430. The contact spring 432 is joined to the circuit board 426. The contact spring 432 is aligned with latch contact 428 of the circuit board 426. The prong 420 of the actuator 418 engages the contact spring 432. The arms 422 of the actuator 418 engage the circuit board 426 to position the actuator 418 within the assembly 400.

The example embodiments provide an electrical assembly that incorporates both lighting and latch activation. The example embodiments reduce a number of components required to configure a tail gate. The example embodiments reduce time and labor required to assemble a tail gate with both lighting and latch activation. The example embodiments also provide an electrical assembly having a water tight seal to prevent damage to the assembly and/or the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A combination light and switch assembly for a panel of a vehicle, the assembly comprising:

a circuit board having an LED contact and a latch contact, the latch contact configured to electrically couple to a latch of the panel;

a LED joined to the LED contact, the LED configured to illuminate at least a portion of the panel;

an actuator assembly moveable toward the circuit board so that the actuator assembly engages the latch contact to operate the latch of the panel when the latch contact is engaged by the actuator assembly, the actuator assembly disposed laterally inwardly of the LED; and a lens aligned with the LED and configured to direct light from the LED to the at least a portion of the panel, the lens extending away from the circuit board to a lens end surface that extends at least flush to an exterior surface of a housing, whereby the light from the LED is directed around a side of the actuator assembly and oriented past the side of the actuator assembly and toward the at least a portion of the panel.

2. The assembly of claim 1, wherein the actuator assembly includes a contact spring joined to the circuit board, the contact spring configured to engage the latch contact of the circuit board.

3. The assembly of claim 1, comprising two lenses, the lenses disposed on opposing sides of the actuator assembly, each of the two lenses directing light from a corresponding LED joined to the circuit board, wherein the actuator assembly comprises a push button, wherein the two lenses are disposed on opposite sides of the push button and extend alongside the push button.

4. The assembly of claim 1 further comprising a boot configured to provide a water tight seal, the boot including a lens aperture extending therethrough, the aperture configured to sealingly accept the lens.

5. The assembly of claim 1 further comprising a transparent boot configured to allow light from the LED to pass therethough.

6. The assembly of claim 1, wherein the actuator assembly includes an actuator having raised ribs that engage the circuit board and recesses formed between the raised ribs, the recesses providing clearance for components of the circuit board when the actuator assembly is moved toward the circuit board.

7. The assembly of claim 1 further comprising a boot having a push button, the push button aligned with the actuator assembly, the push button configured to receive a force that moves the actuator assembly toward the circuit board.

8. The assembly of claim 1, wherein the actuator assembly includes an actuator having a stop configured to limit movement of the actuator assembly toward the circuit board.

9. The assembly of claim 1 further comprising a cover, the printed circuit board joined to the cover, the cover configured to couple to the panel.

10. A combination light and switch assembly for a panel of a vehicle, the assembly comprising:

a housing having an opening extending therethrough, the housing configured to couple to the panel;

a circuit board having an LED contact and a latch contact, the latch contact configured to electrically couple to a latch of the panel;

a LED joined to the LED contact, the LED configured to illuminate at least a portion of the panel;

an actuator assembly accessible through the opening in the housing, the actuator assembly moveable toward the circuit board so that the actuator assembly engages the latch contact to operate the latch of the panel when the latch contact is engaged by the actuator assembly, the actuator assembly disposed laterally inwardly of the LED within the housing; and a lens aligned with the LED and configured to direct light from the LED to the at least a portion of the panel, the lens extending away from the circuit board to a lens end surface that extends at least flush to an exterior surface of the housing, whereby the light from the LED is directed around a side of the actuator assembly and toward the at least a portion of the panel.

11. The assembly of claim 10, wherein the actuator assembly includes a contact spring joined to the circuit board, the contact spring configured to engage the latch contact of the circuit board.

12. The assembly of claim 10 wherein the panel is configured to support a license plate, and the LED and lens are configured to illuminate the license plate.

13. The assembly of claim 10 further comprising a boot configured to provide a water tight seal, wherein the boot is secured within the housing and interposed between the housing and the circuit board.

14. The assembly of claim 10 further comprising a boot configured to provide a water tight seal, the boot including a lens aperture extending therethrough, the aperture configured to sealingly accept the lens.

15. The assembly of claim 10, wherein the actuator assembly includes an actuator having raised ribs that engage the circuit board and recesses formed between the raised ribs, the recesses providing clearance for components of the circuit board when the actuator assembly is moved toward the circuit board.

16. The assembly of claim 10 further comprising a boot having a push button, the push button extending through the opening in the housing, the push button aligned with the actuator assembly, the push button configured to receive a force that moves the actuator assembly toward the circuit board.

17. The assembly of claim 10, wherein the actuator assembly includes an actuator having a stop configured to limit movement of the actuator assembly toward the circuit board.

18. An assembly for a panel of a vehicle, the assembly comprising:
a housing having an opening extending therethrough, the housing configured to couple to the panel;
a combination light and switch assembly comprising:
a circuit board having an LED contact and a latch contact, the latch contact configured to electrically couple to a latch of the panel,
a LED joined to the LED contact, the LED configured to illuminate at least a portion of the panel,
an actuator assembly accessible through the opening in the housing, the actuator assembly moveable toward the circuit board so that the actuator assembly engages the latch contact to operate the latch of the panel when the latch contact is engaged by the actuator assembly, the actuator assembly disposed laterally inwardly of the LED within the housing, and
a lens aligned with the LED and configured to direct light from the LED to the at least a portion of the panel, the lens extending away from the circuit board to a lens end surface that extends at least flush to an exterior surface of the housing, whereby the light from the LED is directed around a side of the actuator assembly and toward the at least a portion of the panel, and
a boot having a push button extending through the opening in the housing, the boot configured to provide a water tight seal, the boot secured within the housing and interposed between the housing and the circuit board, the push button aligned with the actuator assembly, the push button configured to receive a force that moves the actuator assembly toward the circuit board; and
a cover joined to the housing to enclose the light and switch assembly.

19. The assembly of claim 18, wherein the boot is transparent to allow light from the LED to pass therethough.

20. The assembly of claim 18, wherein the boot includes a lens aperture extending therethrough, the aperture configured to sealingly accept the lens.

* * * * *